United States Patent [19]

Butler

[11] 3,913,236

[45] Oct. 21, 1975

[54] APPARATUS FOR DETERMINING WHEEL ALIGNMENT

[75] Inventor: Louis L. Butler, Baton Rouge, La.

[73] Assignee: Bear Manufacturing Corporation, Rock Island, Ill.

[22] Filed: Sept. 13, 1973

[21] Appl. No.: 396,812

Related U.S. Application Data

[63] Continuation of Ser. No. 234,838, March 15, 1972, abandoned.

[52] U.S. Cl. ............................... 33/336; 33/203.18
[51] Int. Cl.² ......................................... G01B 5/255
[58] Field of Search .................. 33/335, 336, 203.18

[56] References Cited
UNITED STATES PATENTS

| | | | |
|---|---|---|---|
| 1,889,490 | 11/1932 | Phelps | 33/336 |
| 1,971,702 | 8/1934 | Burgan | 33/336 |
| 2,765,540 | 10/1956 | MacMillian et al. | 33/366 X |
| 3,026,625 | 3/1962 | Carey, Sr. | 33/390 |
| 3,392,454 | 7/1968 | Haley | 33/336 |
| 3,409,991 | 11/1968 | Davis et al. | 33/335 |

Primary Examiner—William D. Martin, Jr.
Attorney, Agent, or Firm—Roy E. Petherbridge; Robert L. Lindgren; Edward D. Gilhooly

[57] ABSTRACT

A sensing head for determining wheel alignment angles is mounted on a wheel clamp assembly and includes gravity sensing variable impedance electrolytic transducers which are selectively positionable relative to the assembly and are connectable in a bridge circuit for indicating the angle of the respective transducer to the horizontal, and a spirit level also prepositioned on the assembly, with one transducer and the spirit level being in parallel opposed relation to one another.

7 Claims, 11 Drawing Figures

U.S. Patent   Oct. 21, 1975   Sheet 1 of 2   3,913,236
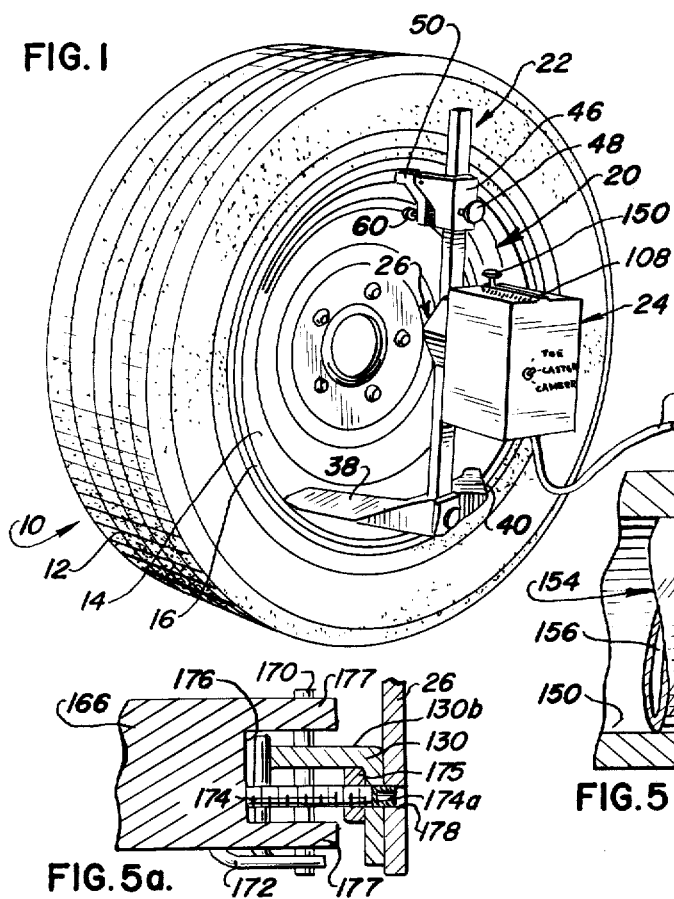
FIG. 1
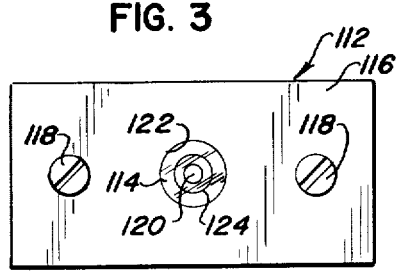
FIG. 3
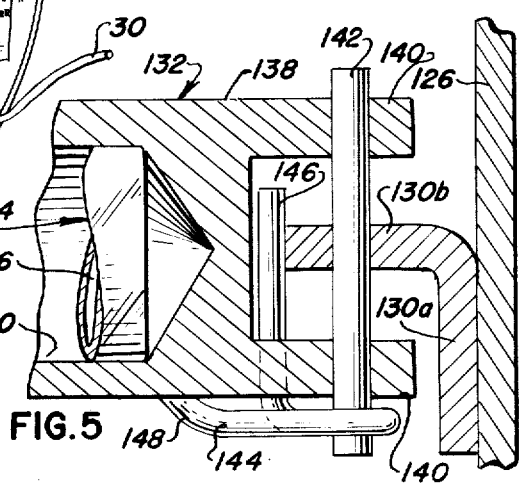
FIG. 5a.
FIG. 5
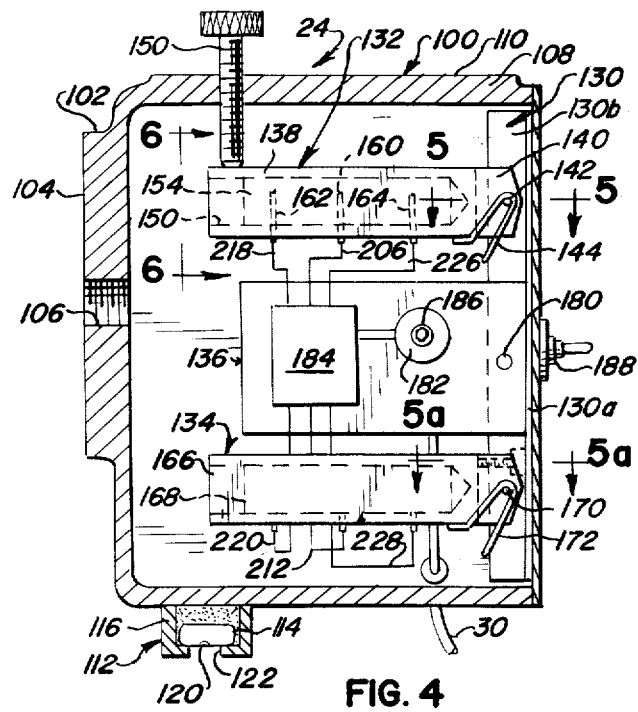
FIG. 4
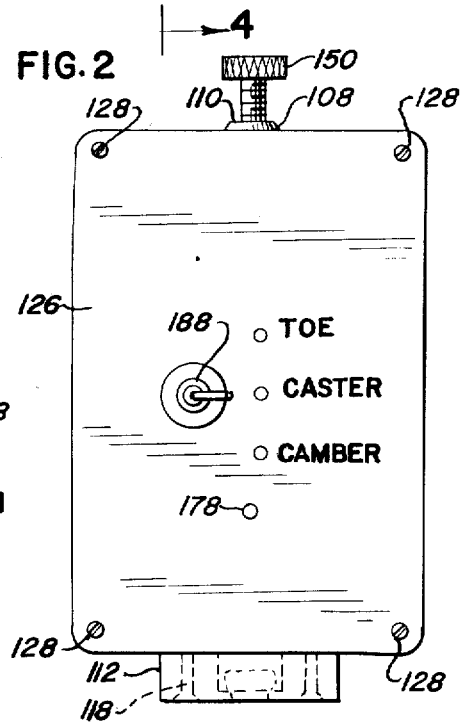
FIG. 2

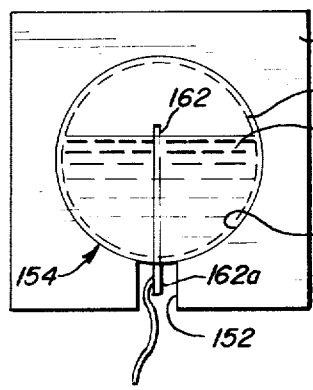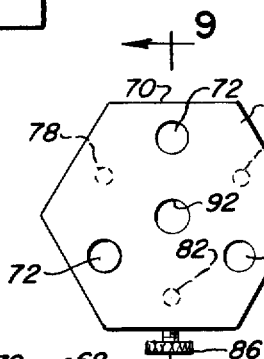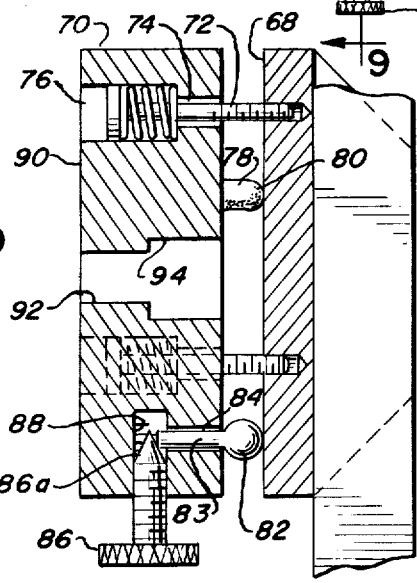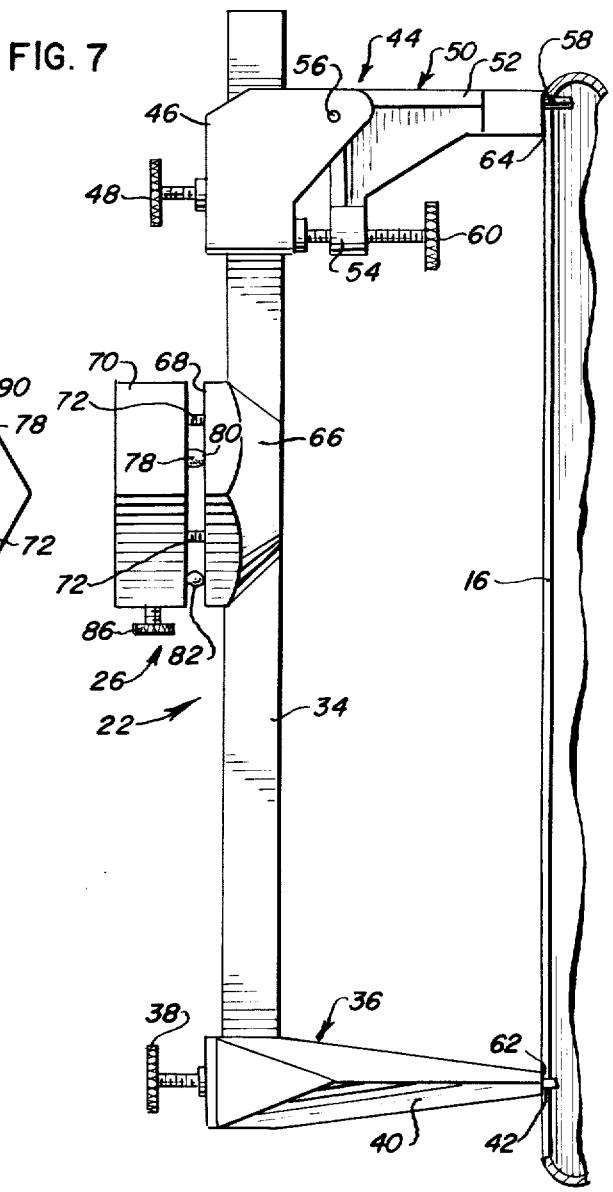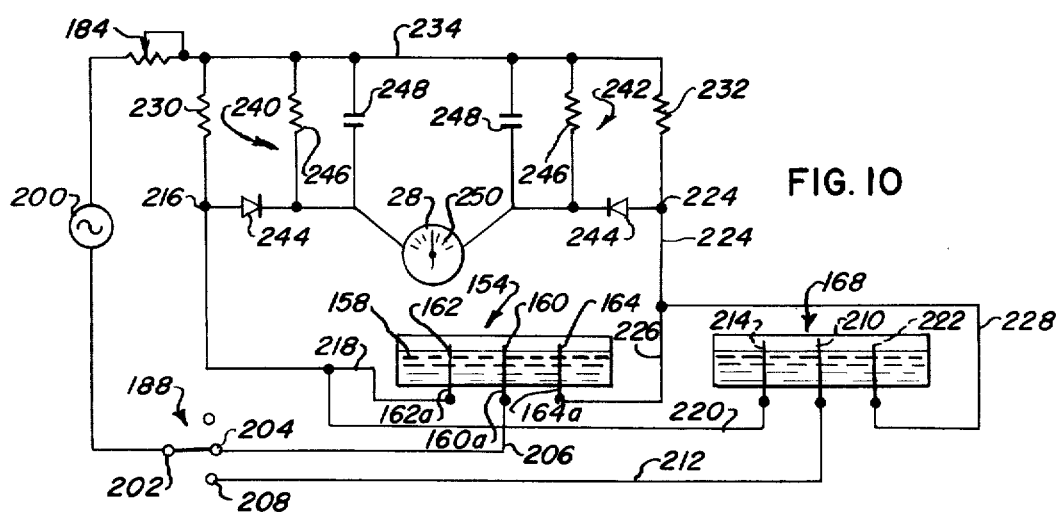

3,913,236

APPARATUS FOR DETERMINING WHEEL ALIGNMENT

This is a continuation, of application of prior application Ser. No. 234,838 filed on Mar. 15, 1972 and is now abandoned.

BACKGROUND OF THE INVENTION

This invention pertains to improvements in apparatus for use in aligning wheels on automotive vehicles, and particularly to apparatus utilizing in measuring certain angles in front wheel alignment, especially the camber and caster angles.

Camber and caster angles are two of the values which are measured and adjusted to be within certain prescribed limits when aligning the wheels of an automotive vehicle. Determining each of these angles requires measuring the vertical angle between a plane corresponding generally to the plane of rotation of the wheel and true vertical under appropriate conditions. However, most systems for measuring these angles are designed to establish a reference line or plane at right angles to the plane or rotation and utilize a gravity actuated device such as a spirit level or pendulum to determine or measure departure of this reference from horizontal as a measure of the subject vertical angle. By way of specific examples, Martin U.S. Pat. No. 2,177,669 discloses a spirit level device for measuring camber and caster angles, and MacMillan et al. U.S. Pat. No. 2,765,540 discloses an arrangement for measuring such angles with a pendulum and variable inductive magnetic coupling arrangement. Holaday U.S. Pat. No. 2,603,881 discloses another approach which utilizes relative movement between various reference components for varying electrical resistances in determining these values.

Prior devices of the spirit level type for measuring camber, caster and similar values have required direct visual observation and interpretation of a spirit level device at the wheel. Other arrangements which were designed to provide other types of readout, either locally or remotely, have been relatively cumbersome, complex, expensive and difficult to maintain in calibration.

SUMMARY OF THE INVENTION

It is an object of this invention to provide improved apparatus adapted for use in aligning wheels on automotive vehicles.

It is another object of this invention to provide improved apparatus for accurately detecting, measuring and indicating camber and caster angles and similar values in aligning wheels of automotive vehicles.

It is another object of this invention to provide an improved apparatus for measuring camber and caster of wheels on automotive vehicles and which is adapted to provide a remote readout of the values measured.

It is another object of this invention to provide apparatus of the indicated type for detecting the desired values through electrical circuit means and which is simple to align and calibrate and to maintain in accurate calibration.

It is another object of this invention to provide apparatus meeting the aforestated objects and which is of simple, economical construction and which is easy to operate and reliable to use.

In carrying out this invention in one illustrative embodiment, a mounting assembly is provided for attachment to the rim of a vehicle wheel. A sensing head is attached to a compensator on the mounting assembly which permits adjustment of the sensing head to a horizontal position. The sensing head includes a spirit level and a pair of gravity sensing electrolytic transducers each providing a pair of variable impedances which may be compared to determine the angle between the axis of the transducer and horizontal. One of the electrolytic transducers and the spirit level are preadjusted to parallel reference positions 180° from one another, i.e., when the head is positioned so that one of these devices reads zero or "level", the opposite device is so positioned that it would read zero if the instrument were rotated 180° about a horizontal axis. The spirit level and the parallel electrolytic transducer are utilized for measuring the camber angle, with the electrolytic transducer being connected in an electrical resistance bridge circuit to detect and provide a remote readout of the camber values. Means are provided for readily adjusting the angular position of the second electrolytic transducer, as in determining the caster angle, with this second transducer being connected in the electrical resistance bridge circuit for providing remote readout of the measured values.

BRIEF DESCRIPTION

For a more complete understanding of this invention, reference should now be had to the embodiment illustrated in the accompanying drawings and described below by way of an example of the invention.

In the drawings, FIG. 1 is a perspective view of apparatus embodying this invention mounted on a wheel of an automotive vehicle;

FIG. 2 is a front view of the sensing head of the apparatus in FIG. 1;

FIG. 3 is an enlarged bottom view of the spirit level on the sensing head;

FIG. 4 is a sectional view of the sensing head taken generally on line 4—4 of FIG. 2 and looking in the direction of the arrows;

FIG. 5 is an enlarged partial section taken along line 5—5 of FIG. 4 and looking in the direction of the arrows;

FIG. 5a is a partial sectional view taken along line 5a—5a of FIG. 4 and looking in the direction of the arrows;

FIG. 6 is an enlarged end view of one of the electrolytic transducer units taken generally along the line 6—6 of FIG. 4 and looking in the direction of the arrows;

FIG. 7 is a side view of the wheel clamp and compensator components of the apparatus of FIG. 1;

FIG. 8 is an end view of the compensator of FIG. 7;

FIG. 9 is an enlarged sectional view taken along line 9'9 of FIG. 8 and looking in the direction of the arrows; and FIG. 10 is a wiring diagram of the apparatus of FIG. 1 and related sensing and indicating apparatus.

DESCRIPTION OF THE PREFERRED EMBODIMENTS

Referring to FIG. 1, an automobile wheel 10 is illustrated, comprising a pneumatic tire 12 and a wheel rim 14 mounted on an automobile (not shown). The rim 14 includes a conventional in-turned annular edge flange 16 around its outer periphery, see also FIG. 7.

The illustrated measuring apparatus 20 comprises a wheel clamp assembly 22 and a sensing head unit 24 which is mounted on the wheel clamp assembly 22 by a compensator assembly 26. The sensing head 24 includes electrical components for providing output signals corresponding to the angular position of the sensing head relative to horizontal. These signals are converted to a visual indication by a remote readout meter 28 (FIG. 10) to which the sensing head is connected by conductors in a cable 30. Electrical power is supplied to the sensing head unit through other conductors in cable 30.

Referring more particularly to FIGS. 1 and 7, the mounting assembly 22 includes an elongated mounting bar 34. A generally V-shaped member 36 is provided with an aperture for receiving bar 34, and is secured to the bar in a preselected position adjacent to one end by a thumb screw. The member 36 includes a pair of legs 38 and 40, each of which has a knurled or threaded stud 42 projecting from its distal end for engagement with the edge of flange 16. An adjustable clamp assembly 44 is provided near the opposite end of bar 34. The subassembly 44 includes a mounting block 46 provided with an aperture for slidable mating engagement with the bar 34, and an adjustable thumb screw 48 for securing the subassembly 44 in a desired position longitudinally of the bar. A bell crank arm 50 having legs 52 and 54 is pivotally mounted on the housing 46 as by a pivot pin 56. The leg 52 extends generally normal to the bar 34, and is provided with a knurled or threaded stud 58 projecting from its distal end for engaging the flange 16 in the same manner as studs 42. The leg 54 extends generally parallel to bar 34. A thumb screw 60 is threaded through the distal end of leg 54 and abuts the adjacent lower portion of housing 46 as illustrated in FIG. 7.

As will be seen, with mounting members 36 and 44 properly positioned on bar 34, the pins 42 and 58 will engage a rim 16 at three-spaced points. Rotation of the thumb screw 60 in the appropriate direction will tend to force rotation of the bell crank arm 50 to move leg 54 away from bar 34, which in turn forces pin 58 upward to effect a clamping engagement of pins 42 and 58 on the rim 16. The terminal shoulders 62 and 64 of legs 40 and 52 are equidistant from the bar 34. Thereby with the clamp assembly mounted on a wheel with the shoulders 62 and 64 against the rim 16, the bar 34 is essentially parallel to rim 16 and thus is generally parallel to the plane of rotation of the wheel 10 and perpendicular to the spindle or axle (not shown) on which the wheel is mounted.

As is known, the plane defined by three random points on a rim 16, and for that matter the center plane of a wheel on a vehicle, are rarely vertical. This is due both to desirable angular settings of a wheel assembly, particularly in front wheels, and to variations in the wheel rims and related assemblies which may be inherent or induced by use. To permit compensation for such variations, a compensator mechanism 26 is provided for mounting the indicator head on the bar 34.

The compensator 26 includes a base block 66 affixed to the bar 34 and provided with a reference surface 68 generally parallel to the front surface of the bar. Referring also to FIGS. 8 and 9, a compensator block 70 is yieldably mounted on the block 66 by three equiangular spaced studs 72 and cooperating compression springs 73. Each stud 72 is freely slidably received in a bore 74 and counterbore 76 in the block 70 and is threadably engaged in the block 66. Each compression spring 73 surrounds the respective stud 72 in the respective counterbore 76 and is confined between the head of the stud and the shoulder at the inner end of the counterbore as illustrated in FIG. 9. Two fixed abuttment studs 78 are threadably engaged in the block 70 and each includes a rounded distal end 80 abutting the surface 68. A third abuttment stud 82 has a shank 83 slidably received in a passage 84 which is spaced from a line joining the studs 78, and is provided with a rounded distal end which also abuts surface 68. A thumb screw 86 is threadably engaged in an aperture 88 which intersects passage 84. Thumb screw 86 is provided with a tapered distal end 86a which engages the inner end of stud 82 and functions as a cam surface for adjusting the position of this stud longitudinally of passage 84.

It will be appreciated that the compression springs 73 continually urge the block 70 towards surface 68, thereby seating the distal ends of the equiangularly spaced studs 78 and 82 on surface 68. Moreover, adjusting the longitudinal position of stud 82 by the adjustment of thumb screw 86 will cause rocking or pivotal adjustment of block 70 relative to block 68 about a pivot axis defined by the ends of the studs 78. Such adjustment effects accurate angular positioning of the block 70, and particularly of its outer machined planar surface 90, relative to bar 34. Block 70 also is provided with a passage 92 and counterbore 94 to receive an appropriate bolt (not shown) for affixing the sensing head to the clamping assembly. The sensing head thus is fixed relative to the clamp assembly 22 except for the selective angular adjustment of the block 70 relative to block 66.

Referring now to FIGS. 2–4, the sensing head 24 includes a housing 100 of appropriate rigid material, such as cast aluminum. At its rear side, the housing includes a boss 102 having a machined planar surface 104 for accurate mating engagement with the surface 90 of the compensator assembly, and further is provided with a threaded aperture 106 for engagement by a mounting bolt, as referred to above, which rigidly affixes the housing 100 to the compensator block 70. An elongated boss 108 extends longitudinally along the top of the housing 100 and is provided with a machined reference surface 110 in a plane perpendicular to the surface 104.

A spirit level unit 112 is attached to the bottom of the housing 100. The unit 112 includes a spherical leveling vial 114 cemented in a housing 116 which is secured to the housing 110 as by machine screws 118. The vial 114 is filled with a fluid, in the usual manner, except for a reference bubble 120, which is viewable through an aperture 122 in the lower wall of housing 116. Reference lines such as a circle 124 may be provided on the vial to assist an observer in making accurate readings.

A cover plate 126 is attached to the front of the housing 110 by screws 128 and closes the front opening of the housing. The internal sensing and control components are mounted on the cover plate 126. This mounting arrangement permits convenient assembly, removal and access to these components. Referring particularly to FIGS. 4 and 5, an L-shaped mounting strip 130 is attached to the inner surface of the cover 126, as by spot welding one leg 130a to the cover. The second leg 130b provides a mounting spine or frame member to which the sensing units are attached. These units include a pair of gravity responsive electrolytic transducer units 132 and 134, and a circuit board assembly 136.

The transducer unit 132 comprises an elongated housing 138 having a pair of spaced parallel legs 140 projecting from one end and straddling the frame member 130b in the upper portion of the housing 100. A pin 142 extends through appropriate apertures in the legs 140 and in the spine 130b for pivotally supporting the housing 138. A spring 144 is engaged on the pin 142 and provided with legs 146 and 148 bearing against the spine 130 and the lower surface of housing 138, respectively, to resiliently urge the outer end of the transducer unit 132 upwardly about pin 70, in a clockwise direction as viewed in FIG. 4. A thumb screw 150 is threadably engaged in the top wall of the housing 100 and provides an adjustable stop for the unit 132. It will be appreciated that the angular position of the transducer unit 132 may be readily adjusted about the axis of pin 142 by simply adjusting the thumb screw 150.

Referring also to FIG. 6, the housing 138 is provided with a longitudinal bore 150 and an elongated slot 152 of equal length extending from this bore to the bottom surface. A gravity sensing electrolytic transducer 154 is inserted in the bore 150 with a friction fit, and with the electrical connectors accommodated in slot 152. The transducer 154 may be of known construction, such as the EP 10-750 transducer of Hamlin, Inc., Lake Mills, Wis. This transducer comprises an elongated cylindrical sealed glass tube 156 which is partially filled with a liquid electrolyte 158 and provided with three conductor pins 160, 162 and 164. Each of these pins extends through the glass tube at its lower side and upward in the electrolyte with each of the upper ends extending slightly above the liquid surface when the longitudinal axis of the tube is horizontal, see FIG. 10. Each pin is provided with a connector end 160a, 162a and 164a, respectively, external to the tube 156. As will be seen from FIGS. 4, 6 and 10, the three conductor pins are disposed along the longitudinal center line of the tube 156, and with the end pins 162 and 164 at equal spacings from the center pin 160.

Transducer unit 134 includes a housing 166 and a transducer 168 of the same construction and assembled in the same manner as the unit 132. Unit 134 is pivotally mounted at the lower end portion of rib 130b by a pin 170 and a spring 172, also in the same manner as the unit 132. Referring also to FIG. 5a, angular adjustment of the unit 134 is effected and maintained by a threaded stud 174 which is threadably engaged in the mounting strip 130, and/or in a nut 175 affixed to said strip, and which abuts an upper portion of the opposing surface 176 of the housing 166 between the mounting leg portions 177. Stud 174 is provided with a polygonal socket 174a in its outer end which is accessible through the opening 178 in the cover plate 126 for engagement by an appropriate mating tool for adjusting the stud 174 and thus the angular position of transducer 168 relative to housing 110.

The circuit board 136 comprises an appropriate mounting component suitably affixed to the rib 130 between the two transducers, as by one or more bolts or rivets 180. Components of the control circuit referred to below in discussing FIG. 10 are mounted on the board 136, as indicated schematically by a rotary-type variable resistor 182 and by the block 184. The rotor component of the resistor 182 is provided with an operating shaft 186 having a polygonal socket for mating engagement by an appropriate tool applied through an aligned opening (not shown) in the side wall of the housing 110 to conveniently effect calibrating adjustment of this component as referred to further below. A single pole three-position switch 188 is mounted on the cover 126 and suitably connected to the other control circuit components, as will also be referred to below.

Referring now to FIG. 10, an a.c. power source 200 is connected to the common terminal 202 of the switch 188 and to the variable resistor 184. The center pin 160 of the transducer 154 is connected to one contactor terminal 204 of the switch 188 by a conductor 206. Another contactor terminal 208 of switch 188 is similarly connected to the center pin 210 of transducer 168 by a conductor 212. End pin 162 of transducer 154 and a corresponding end pin 214 of the transducer 168 are connected to a terminal or junction 216, as by conductors 218 and 220, respectively. The other end pin 164 of transducer 154 and the corresponding end pin 222 of the transducer 168 are similarly connected to a terminal or junction 224, as by conductors 226 and 228. Resistors 230 and 232 are connected between the respective junctions 216 and 218 and a common conductor 234.

The electrolyte in each transducer effectively provides an electrical conduction path between the center pin and each respective end pin. The impedance of each of the two resulting conduction paths from the connector end of the center pin to the connector ends of the two end pins varies in a predetermined manner as the transducer is tilted to change the angle of its longitudinal axis relative to the horizontal. This variation appears to be related to the changes in the depth of the electrolyte in the respective portion of the transducer. In any event, when the transducer is in a horizontal position, the impedances of the two paths are equal. As the transducer is tilted from the horizontal about an axis transverse to its longitudinal axis, the impedance of the circuit through the upper pin will increase and the impedance of the circuit through the lower pin will decrease. Thus the relationship between these two impedance values is a measure of the angular position of the transducer, i.e., its longitudinal axis, relative to horizontal.

With the switch 188 adjusted to connect the power source 200 to the center pin of one of the transducers, as to the connector 160a of the transducer 154, a bridge circuit is established having a first junction or terminal corresponding to the connector 160a, one leg of variable impedance extending from the connector 160a through the electrolyte 158 to the connector 162a and to the terminal 216, a second leg of variable impedance extending from the connector 160a through the electrolyte 158 to the connector 164a and to the terminal 224, and two legs from the junctions 216 and 224 through the respective resistors 230 and 232 to the common conductor 234. Means for obtaining an output signal corresponding to the difference between the two noted variable impedances comprises a rectifier circuit 240 connected between junction 216 and conductor 234, a similar rectifier circuit 242 connected between junction 224 and conductor 234, and a d.c. volt meter 28 connected between the two noted rectifier circuits. Each rectifier circuit comprises a diode 244 suitably connected to the respective junction 236 or 238, and a resistor 246 and a capacitor 248 connected in parallel between the output of the respective diode and the common conductor 234. The meter 28 responds to the voltage difference between the capacitors and provides an output indication corresponding to the difference between the impedances of the two sides of the transducer 154.

The variable resistor 184 is connected between the conductor 234 and the power source 200 for calibrating adjustment of the bridge circuit response to obtain a readout from the volt meter 28 according to a predetermined scale 250 which is calibrated in terms of specific angular positions of a transducer 154 or 168 relative to horizontal.

It will be appreciated that shifting the movable contactor of switch 188 to contactor 208 will connect the transducer 168 in the aforedescribed bridge circuit and disconnect transducer 154. The angular position of the transducer 168 is thereby indicated by meter 28 in the same manner just described for the transducer 154.

By way of specific illustrative values for one operative embodiment, the Hamlin EP 10-750 transducers referred to above provide an impedance between connector 160a and each connector 162a and 164a of about 1100 ohms. A bridge circuit which has been used with such transducers and a 12 v., 60 Hz power source 200 utilized resistors 230 and 234 of 1000 ohms, resistors 240 and 246 of 10,000 ohms, and capacitors 248 of 100 MFD and a rating of 25 volts d.c. Resistor 184 was of 1000 ohms maximum impedance, and volt meter 28 was of high impedance and calibrated for 5 volts d.c.

In the illustrated unit 24, transducer 154 is intended for use in measuring caster, and transducer 168 is intended for use in measuring camber. The transducer 168 is calibrated to the other components of the sensing unit in that it is positioned parallel to a line perpendicular to surface 104, i.e., to be horizontal or level when surface 104 is vertical. To so calibrate transducer 168, the housing 100 is positioned upright and is adjusted to a level or horizontal position in accordance with a meter level positioned on the reference surface 110. Switch 188 is positioned to place the transducer 168 in the readout circuit. Adjustment screw 174 is then manipulated to adjust the angular position of the transducer 166 about pin 170 until the meter 28 reads zero. To calibrate the readout from the sensing circuitry, the housing is then tilted through a predetermined angle, e.g., 3°, about a horizontal axis parallel to surface 104. The variable resistor 184 is then adjusted by rotating shaft 186 until meter 28 shows a reading corresponding to the predetermined angle in an appropriate direction from its zero position. These two calibration settings basically are one-time factory adjustments. However, it will be appreciated that both can be checked and adjusted easily in the field due to the simplicity of the adjustments and the ready access provided to the adjusting mechanisms.

The spirit level 112 is disposed with the vial 114 in parallel opposed relation to the transducer 168. That is, the vial is fixed parallel to a line perpendicular to surface 104 and oriented to read zero or level when the unit 24 is rotated 180° about a horizontal axis from the zero reference position of transducer 168. Accordingly, with surface 104 in a vertical plane, transducer 168 is horizontal and will read "zero" when housing 100 is in an upright position as in FIGS. 1 and 4, and vial 114 is horizontal and will read zero, or level, when the housing is inverted.

Transducer 154 is generally parallel to transducer 168, and is intended to be angularly adjusted in use. The readout of transducer 154 is calibrated in the same general manner as described above for the transducer 168, i.e., utilizing a reference level on surface 100 and first adjusting the transducer to a zero reading of meter 28, then tilting the housing through a predetermined angle and adjusting the calibration component of the circuit to obtain an appropriate reading on the meter.

When utilized for measuring the camber angle of a wheel on an automobile, the described apparatus is clamped to the wheel as described above. The wheel and apparatus 20 are positioned with the sensing unit inverted, i.e., with the spirit level unit 112 uppermost. (The fact that the vial 114 is a 180° vial, i.e., which can read zero or level in an upright position or inverted position will provide a check for insuring that the head unit 24 is substantially vertical.) The compensator unit 26 is adjusted as necessary by rotation of the thumb screw 86 until the position of the bubble 120 indicates that the reference axis of the unit 24 perpendicular to surface 104 is horizontal. This initial adjustment is made with the weight of the vehicle on the wheel. Thereafter the vehicle is raised and the wheel is rotated 180°, or the vehicle is moved forward or rearward to effect such 180° rotation. This orients the sensing head 24 in an upright position as illustrated in FIGS. 1 and 4. With switch set to connect transducer 168 in the control circuit, i.e., in the "camber" position, the reading provided on meter 28 indicates the camber angle of the wheel on which the unit is mounted.

For determining caster, the selector switch 188 is set to the "caster" position to place transducer 154 in the bridge circuit. The wheel assembly is first turned about its steering axis 20° to one side from the straight-ahead position, with the sensing unit in its upright position as illustrated in FIGS. 1 and 4. With the wheel turned as described, thumb screw 150 is adjusted to obtain a zero reading on meter 28, whereby the transducer is in the level or horizontal position. The wheel assembly is then turned through an angle of 40° about its steering axis, i.e., 20° on the other side of the straight-ahead position. The angular position of the transducer 132 then is noted as indicated by the meter 28, which indicates the caster angle.

Where different calibrations are desired for obtaining direct camber and caster angle readings from meter 28, two appropriately correlated scales may be marked on the meter. Alternatively, two different meters, each of appropriate calibration, may be utilized for the camber and caster measurements, or two calibrating devices such as resistor 184 may be utilized. In such an arrangement, the circuitry could be so arranged that changing position of a control switch to select the appropriate transducer, such as switch 188, simultaneously places the appropriate meter and/or calibrating component in the sensing circuit. As another alternative a separate circuit may be provided for each transducer.

In another alternative, by providing an appropriate reference system for quickly, accurately and reliably positioning transducer 154 in a reference position perpendicular to surface 104, a single transducer may be utilized to measure both camber and caster. A third contactor is shown for switch 188 in FIG. 10, and may be utilized for appropriate connection of the power source where the device 20 also is to be utilized for measuring other alignment values, such as the "toe" angle of the front wheels as indicated in FIG. 2.

It will be apparent to those skilled in the art that other modifications and embodiments of the specific apparatus disclosed herein may be made without departing from the spirit and scope of the invention. Particular construction and fabrication details of one embodiment are disclosed only by way of example, and the various components may be fabricated and assembled in other configurations.

It will be seen that improvements have been provided which meet the aforestated objects.

While a particular embodiment of this invention is shown and described herein, it will be understood, of course, that the invention is not limited thereto, since many modifications may be made by those skilled in the art, particularly in light of the teachings herein. It is contemplated, therefore, by the appended claims to cover any such modifications as fall within the true spirit and scope of this invention.

What is claimed is:

1. An apparatus for use in determining the alignment of wheels of automotive vehicles comprising:

support means for attachment to such a wheel and thereby defining a reference plane;

a first angle-responsive mechanical-electrical transducer attached to said support means and disposed so as to be responsive to the change in angular position, relative to horizontal, of an axis at right angles to said reference plane;

said first transducer comprising an elongated electrolytic transducer and being pivotally mounted on said support means;

means for adjusting the position of said first transducer about said pivotal mounting;

a spring positioned to urge said first transducer in one direction of pivotal adjustment about said pivotal mounting;

a second angle-responsive mechanical-electrical transducer disposed parallel to said first transducer and adjustably mounted on said support means for selective adjustment relative to a plane perpendicular to said reference plane, each of said first and second transducer having three terminals, and providing variable impedance between one of said terminals and each of the other two terminals in accordance with the angular disposition of said respective transducers relative to the horizontal;

adjustable abutment means for retaining said second transducer in a predetermined position;

circuit means responsive to said impedances of each of said first and second transducers for indicating the angular position therefore relative to the horizontal; and means for selectively connecting said first and second transducers to said circuit means.

2. An apparatus as claimed in claim 1, wherein said transducers are electrolytic transducers.

3. An apparatus as claimed in claim 1, wherein said responsive means comprises a bridge circuit, said one terminal of each transducer being a first junction of said bridge and connected to said connection means, said other two terminals being connected to second and third junctions of said bridge, whereby said variable impedances are in two legs of said bridge, a fixed impedance connected between each of said second and third junctions and a fourth junction of said bridge, an a.c. power source connected directly to said fourth junction and said connecting means, and means responsive to the difference in potential between said second and third junctions to indicate the angular position of said transducer.

4. An apparatus as claimed in claim 3, wherein said last-mentioned means comprises rectifier circuit means connected between each of second and third junctions and said fourth junction, and a d.c. volt meter connected between said rectifier circuits.

5. An apparatus for use in determining the alignment of wheels of automotive vehicles comprising:

support means for attachment to such a wheel and thereby defining a reference plane;

an angular-responsive mechanical-electrical transducer disposed so as to be responsive to the change in angular position of said support means relative to horizontal when said apparatus is rotated a predetermined angle from a first position, said transducer having a longitudinal axis;

compensator means operatively coupled to said transducer for adjusting angularly the longitudinal axis thereof to a horizontal position after attachment of the support means to a wheel;

said transducer having three terminals and providing variable impedances between one of said terminals and each of the other two terminals in accordance with the angular disposition of said transducer relative to the horizontal; and circuit means responsive to said impedances of said transducer for indicating the angular position therefor relative to the horizontal upon said predetermined rotation from a first position.

6. An apparatus as claimed in claim 5, further comprising a second angular-responsive mechanicalelectrical transducer disposed parallel to said first transducer and adjustably mounted on said support means for selective adjustment relative to a plane perpendicular to said reference plane.

7. An apparatus as claimed in claim 5, wherein said compensator means includes a leveling vial mounted on said support means and disposed parallel to said transducer.

* * * * *

UNITED STATES PATENT OFFICE
CERTIFICATE OF CORRECTION

Patent No. 3,913,236   Dated October 21, 1975

Inventor(s) Louis L. Butler

It is certified that error appears in the above-identified patent and that said Letters Patent are hereby corrected as shown below:

Column 2, line 56, delete "9'9" and insert -- 9 - 9 --.

Column 3, line 18, after "screw" insert -- 38 --.
Column 3, line 19, delete -- 38 and --.
Column 7, line 42, delete "meter" and insert -- master --.
Column 8, line 1, delete "zero" and insert -- "zero" --.
Column 10, lines 47 and 48, delete "mechanicalelectrical" and insert -- mechanical-electrical --.

Signed and Sealed this

Twentieth Day of July 1976

[SEAL]

Attest:

RUTH C. MASON
Attesting Officer

C. MARSHALL DANN
Commissioner of Patents and Trademarks